US009681051B2

(12) United States Patent
Rachlin et al.

(10) Patent No.: US 9,681,051 B2
(45) Date of Patent: Jun. 13, 2017

(54) METHOD AND APPARATUS FOR MOTION CODED IMAGING

(71) Applicant: Massachusetts Institute of Technology, Cambridge, MA (US)

(72) Inventors: Yaron Rachlin, Newton, MA (US); Sumanth Kaushik, Belmont, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 106 days.

(21) Appl. No.: 14/246,628

(22) Filed: Apr. 7, 2014

(65) Prior Publication Data

US 2015/0049210 A1 Feb. 19, 2015

Related U.S. Application Data

(60) Provisional application No. 61/867,458, filed on Aug. 19, 2013.

(51) Int. Cl.
*H04N 5/232* (2006.01)
*H04N 5/225* (2006.01)
(Continued)

(52) U.S. Cl.
CPC ......... *H04N 5/23287* (2013.01); *G02B 27/46* (2013.01); *H04N 5/2254* (2013.01);
(Continued)

(58) Field of Classification Search
CPC .... H04N 5/23287; H04N 5/33; H04N 5/2259; H04N 5/357; H04N 5/2254; H04N 5/335; G02B 27/46; G02B 2207/129
(Continued)

(56) References Cited

U.S. PATENT DOCUMENTS 5,537,492 A * 7/1996 Nakajima ............... H04N 19/60
375/E7.226
6,856,457 B2 2/2005 Vogt et al.
(Continued)

FOREIGN PATENT DOCUMENTS

WO WO 2006/125975 11/2006
WO WO 2012/127246 9/2012
WO WO 2015/073079 5/2015

OTHER PUBLICATIONS

PCT/US2014/051273 Invitation to Pay Additional Fees and, Where Applicable, Protest Fees dated May 11, 2015 entitled "Motion Coded Imaging".
(Continued)

*Primary Examiner* — Padma Haliyur
(74) *Attorney, Agent, or Firm* — Hamilton, Brook, Smith & Reynolds, P.C.

(57) ABSTRACT

An imaging apparatus and corresponding method according to an embodiment of the present invention enables high-resolution, wide-field-of-view, high sensitivity imaging. An embodiment of the invention is a camera system that utilizes motion of an optical element, such as a spatial filtering mask or of the camera itself, to apply different spatial filtering functions to a scene to be imaged. Features of a spatial filtering mask implementing the different filtering functions are adjacent along an axis of the spatial mask, and a pitch of the features of the mask is smaller than a pitch of the sensor elements. An imaging reconstructor having knowledge of the filtering functions can produce a high-resolution image from corresponding low-resolution coded imaging data captured by the imaging system. This approach offers advantages over conventional high-resolution, wide-field imaging, including an ability to use large-pitch, lower cost sensor arrays, and transfer and store much less data.

39 Claims, 12 Drawing Sheets

(51) Int. Cl.
  H04N 5/33    (2006.01)
  H04N 5/357   (2011.01)
  G02B 27/46   (2006.01)
  H04N 5/335   (2011.01)
(52) U.S. Cl.
  CPC ........... *H04N 5/23232* (2013.01); *H04N 5/33* (2013.01); *H04N 5/357* (2013.01); *G02B 2207/129* (2013.01); *H04N 5/335* (2013.01)
(58) Field of Classification Search
  USPC ............................................ 348/208.11, 342
  See application file for complete search history.

(56) References Cited

U.S. PATENT DOCUMENTS

| | | | |
|---|---|---|---|
| 8,199,244 B2 | 6/2012 | Baraniuk et al. | |
| 2009/0161096 A1* | 6/2009 | Vaez-Iravani | G01N 21/95623 356/237.2 |
| 2011/0085051 A1 | 4/2011 | Chi et al. | |
| 2012/0226480 A1* | 9/2012 | Berkner | G01J 1/0492 703/1 |

OTHER PUBLICATIONS

Brady, D.J., et al., "Compressive Optical Montage Photography," *Proc. of SPIE*, 5907: 590708-1-590708-7 (2005).

Duarte, M.F., et al., "Single-Pixel Imaging Via Compressive Sampling," *IEEESignal Processing Magazine*, 83-91 (Mar. 2008).

Gallet, J., et al., "Increasing FTIR Spectromicroscopy Speed and Resolution Through Compressive Imaging," *Infrared Physics & Technology*, 51: 420-422 (2008).

Guo, J., et al., "Single-shot Subpixel Response Measurement With an Aperture Array Pixel Mask," *Optics Letters*, 31(23): 3441-3443 (2006).

Hislop, G., et al., "Efficient Sampling of Electromagnetic Fields Via The Adaptive Cross Approximation," *IEEE Transactions on Antennas and Propagation*, 55(12): 3721-3725 (2007).

Llull, P., et al., "Coded Aperture Compressive Temporal Imaging," *Optics Express*, 21(9): 10526-10545 (2013).

Portnoy, A.D., et al., "Multichannel Sampling Schemes for Optical Imaging Systems," *Applied Optics*, 47(10): B76-B85 (2008).

Robucci, R., et al., "Compressive Sensing on a CMOS Separable-Transform Image Sensor," *Proc. IEEE*, 11 pages (Apr. 22, 2009).

Notification of Transmittal of the International Search Report and Written Opinion of the International Searching Authority for International Application No. PCT/US2014/051273, Date Mailed, Jul. 17, 2015, "Motion Coded Imaging,".

Notification Concerning Transmittal of International Preliminary Report on Patentability and Written Opinion of the International Searching Authority for International Application No. PCT/US2014/051273, Date Mailed: Mar. 3, 2016, "Motion Coded Imaging,".

Notification of Transmital of International Preliminary Report on Patentability and Writen Opinion of the International Searching Authority for International Application No. PCT/US2014/051273, Date Mailed, Mar. 3, 2016, "Method Coded Imaging,".

\* cited by examiner

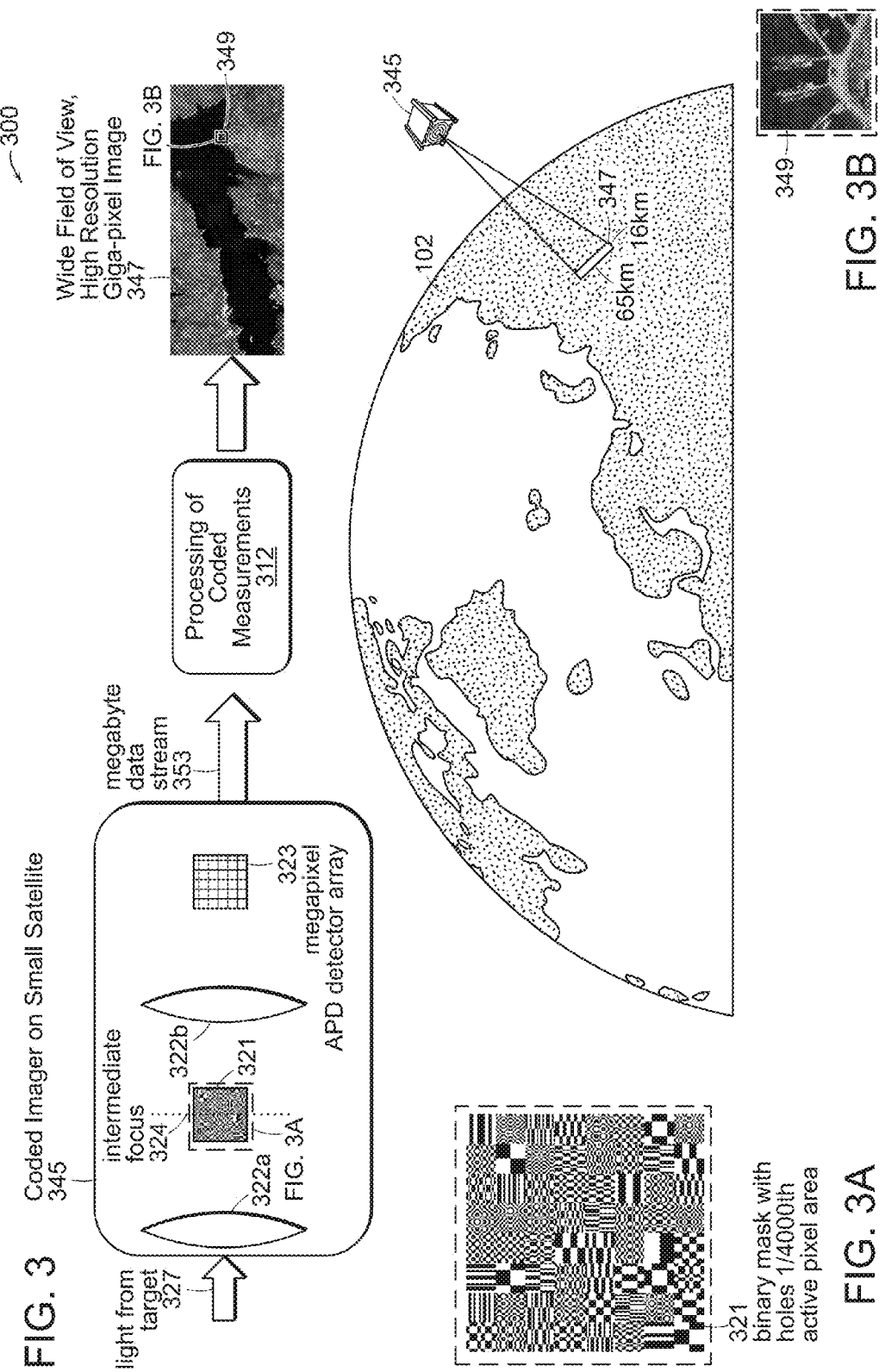

METHOD AND APPARATUS FOR MOTION CODED IMAGING

RELATED APPLICATION

This application claims the benefit of U.S. Provisional Application No. 61/867,458, filed on Aug. 19, 2013. The entire teachings of the above application are incorporated herein by reference.

BACKGROUND

Coded imaging techniques can be used to image targets using compressed data sets. An image may be modulated to obtain the compressed data sets using a binary mask for example. Varying numbers of coded measurements can be reconstructed to reproduce images of a scene with varying degrees of resolution Previous proposals for modulation of light to achieve coding have included using an active micromirror array at an intermediate focus and changing the modulation pattern between measurements at a single pixel. Another proposed design attempts to achieve temporal super-resolution using randomized blocking patterns. Yet another proposed design includes use of an individual aperture corresponding to each spatial filtering function to attempt to achieve encoding diversity.

SUMMARY

Achieving wide field of view, high resolution, and high sensitivity using a compact imaging device is a challenge with existing focal plane arrays. In the visible, existing commercially available technologies force a choice between large pixels, with low noise and high quantum efficiency, and small pixels with a lower quantum efficiency and higher noise. Using a large pixel focal plane sacrifices system compactness, while using small pixel focal planes sacrifices system sensitivity. In the IR, large format focal planes are not commercially available beyond a certain size. Achieving high resolution over a wide field of view with either type of pixel requires storage and transfer of large quantities of image data.

Furthermore, current coding techniques are deficient. For example, a single-pixel imager is limited in potential spatial resolution by the time that is required to modulate images of the target scene between pixel samplings. A stationary scene may be required to obtain sufficient number of samples for a desired resolution. Furthermore, actively scanning micromirror arrays, for example, may increase expense and limit reliability. Besides, extending micromirror array designs to GP-class imaging applications could significantly increase complexity and expense. The use of an aperture corresponding to each sensor pixel likewise can increase complexity. Moreover, attempts to improve temporal super-resolution with randomized blocking or masking functions do not solve the problem of achieving spatial super-resolution.

The current disclosure describes embodiment imaging devices and methods that simultaneously achieve wide field of view, high spatial resolution, and high sensitivity using a compact device that can be inexpensive in the IR, for example. The disclosure describes practical methods of coding large-pixel, small-format focal planes that retain favorable noise properties while improving resolution. Embodiments can obtain these benefits without multiple apertures and even without active scanning elements such as micromirrors. Coding diversity can be achieved entirely passively, for example, by relying on motion of an imaging apparatus with respect to a scene to be imaged. Additionally, embodiment devices can be made simpler and more compact by eliminating any intermediate focal plane and applying mask elements directly to a sensor array to lie in a focal plane at or near the sensor array.

In one embodiment, mechanical motion is applied to an optical element of an imaging apparatus, such as a spatial mask, in applying various filtering functions efficiently to a scene to be imaged. In another embodiment, motion of the entire imaging apparatus itself relative to the scene to be imaged can be relied upon in applying the various filtering functions to achieve coding diversity. The scene need not be stationary with respect to the imager. Advantageously, the motion of an aircraft or satellite carrying an embodiment imaging device for example can be used in applying different filtering functions to achieve coding diversity. Motion coding permits high-sensitivity, low-pixel-count sensor arrays with large pixel pitches to be used, with less regard to manufacturing yields relative to high-pixel-count sensor arrays. Furthermore, encoded images can be stored, transferred, and used with data storage and communications bandwidth requirements significantly relaxed.

An imaging apparatus and the corresponding method according to an embodiment of the invention include one or more apertures configured to receive light from a scene, images of which can be encoded. The apparatus can also include a spatial mask arranged to apply different spatial filtering functions to the light from the scene to produce an encoded image of the scene, features of the mask defining a pitch and being adjacent along an axis of the spatial mask, the one or more apertures being fewer in number than the different spatial filtering functions. The apparatus can further include sensor elements defining a pitch and being configured to sense the encoded image of the scene, the pitch of features of the mask being smaller than the pitch of the sensor elements.

A size of the sensor elements can be larger than an optical diffraction limit of the apparatus. The sensor elements can be configured to acquire spatially filtered images of the scene, from which images of the scene can be reconstructed. Encoded measurements or images of the scene acquired or sensed by the sensor elements can be used to create a reconstructed image, and the reconstructed image can have higher spatial resolution than the sensor elements with the pitch. The smallest pitch of the features of the spatial mask implementing the spatial filtering functions can be approximately equal to an optical diffraction limit of the apparatus.

The different spatial filtering functions can correspond to different spatial patterns in the spatial mask and can be basis functions representing high-energy coefficients corresponding to information such as spatial frequencies in the scene. The different functions can be selected to correspond to expected information such as spatial characteristics in the scene. The spatial mask can be passive, with the different functions of the mask being fixed functions. Alternatively, the spatial patterns can be adjustable, with the apparatus further including a spatial pattern controller in operative communication with the mask to cause the mask to adjust the spatial patterns. The spatial mask can be situated at an intermediate focal plane of the imaging apparatus and/or between lenses of the imaging apparatus.

The axis can be a first axis, and the features can be first features. The mask can further include second features implementing the different filtering functions being adjacent along a second axis of the spatial mask, the second axis being non-collinear with the first axis. The imaging apparatus can also include an image processor configured to apply reconstruction as a function of the functions of the mask to data acquired by the sensor elements to reconstruct an image of the scene. The image processor can be configured to apply a low-fidelity or a high-fidelity reconstruction. Furthermore, the image processor can be configured to apply reconstruction of nonconsecutive encoded measurements or images of the scene.

The imaging apparatus can include a transmitter configured to transmit data captured by the sensor elements to a reconstruction server and a receiver configured to receive a representation of a reconstructed image from the reconstruction server. The apparatus can also include memory storing representations corresponding to the functions of the mask and an image reconstruction coordinator module configured to read the representations from the memory and forward the representations to the server with the data by the transmitter.

The imaging apparatus can include a motion actuator configured to apply the different spatial filtering functions to the light from the scene by applying motion to at least one of the mask or the sensor elements. Alternatively, the spatial mask can be configured to apply the different spatial filtering functions by applying motion to the imaging apparatus with respect to the scene.

The spatial mask of the imaging apparatus can be further arranged to apply the different spatial filtering functions as part of an analog optical linear transformation to a basis set differing from a pixel basis, and the encoded measurements corresponding to the scene to be encoded at the sensor elements can be basis coefficients for the basis set. The apparatus can further comprise a processor configured to nonlinearly compress the basis coefficients.

The apparatus can also include a single aperture configured to transmit light from the entire scene onto the spatial mask. The number of the one or more apertures configured to receive or accept light from the scene can be one.

A method of imaging according to an embodiment of the invention includes receiving light, through one or more apertures, from a scene. The method can also include applying different spatial filtering functions to the light from the scene to produce an encoded image of the scene, using a spatial mask having features implementing the different filtering functions, the features defining a pitch and being adjacent along an axis of the spatial mask, the one or more apertures being fewer in number than the different spatial filtering functions. The method can also include sensing the encoded image of the scene using sensor elements defining a pitch, the pitch of features of the mask being smaller than the pitch of the sensor elements.

The method can further include transmitting data captured by the sensor elements to a reconstruction server or receiving a representation of a reconstructed image from the reconstruction server. The method can also include storing representations corresponding to the functions of the spatial mask and transmitting the representations to the reconstruction server.

The method can include making encoded measurements made by the sensor elements available for reconstruction of an image of the scene with higher spatial resolution than the pitch of the sensor elements. The method can also include passing light from the entire scene to be imaged through a single aperture. Receiving the light can be through one aperture only.

An imaging apparatus according to an embodiment of the invention includes means for receiving light, through one or more apertures, from a scene. The apparatus also includes means for applying different spatial filtering functions to the light from the scene to produce an encoded image of the scene, using a spatial mask having features implementing the different filtering functions, the features defining a pitch and being adjacent along an axis of the spatial mask, the one or more apertures being fewer in number than the different spatial filtering functions. The imaging apparatus can also include means for sensing the encoded image using sensor elements defining a pitch, a pitch of the features of the mask being smaller than the pitch of the sensor elements. Moreover, the imaging apparatus can include means for applying motion to at least one the spatial mask or the sensor elements.

An imaging apparatus according to an embodiment of the invention includes an array of sensor elements and an array of spatial masks. Each of the spatial masks is arranged with respect to a corresponding sensor element of the array of sensor elements such that a spatial filtering function associated with the spatial mask is configured to be applied to a scene to be encoded via motion of the imaging apparatus with respect to the scene. Each spatial mask arranged with respect to a corresponding sensor element can include a lithographic pattern applied to the sensor element. The apparatus can also include one or more optics configured to produce an image of the scene at the array of sensor elements without an intermediate focal plane. Each spatial mask of the imaging apparatus can be further configured such that a spatial filtering function associated with the spatial mask is configured to be applied at least twice to images of the scene to be imaged via the motion of the imaging apparatus with respect to the scene.

A method of imaging according to an embodiment of the invention includes applying motion to an optical element of an imaging device with respect to a scene to be imaged to apply different spatial filtering functions to images of the scene produced by the imaging device. Applying motion of the optical element can include using motion of a spatial mask.

A method of imaging according to an embodiment of the invention includes using motion of an imaging device with respect to a scene to be imaged to apply different spatial filtering functions to an image of the scene produced by the imaging device. Applying the different spatial filtering functions can include using one or more spatial masks.

BRIEF DESCRIPTION OF THE DRAWINGS

FIG. 3 is a schematic illustration of a satellite-based imaging apparatus according to an embodiment of the present invention. FIGS. 3A and 3B show parts of FIG. 3 in greater detail.

Figure 1:
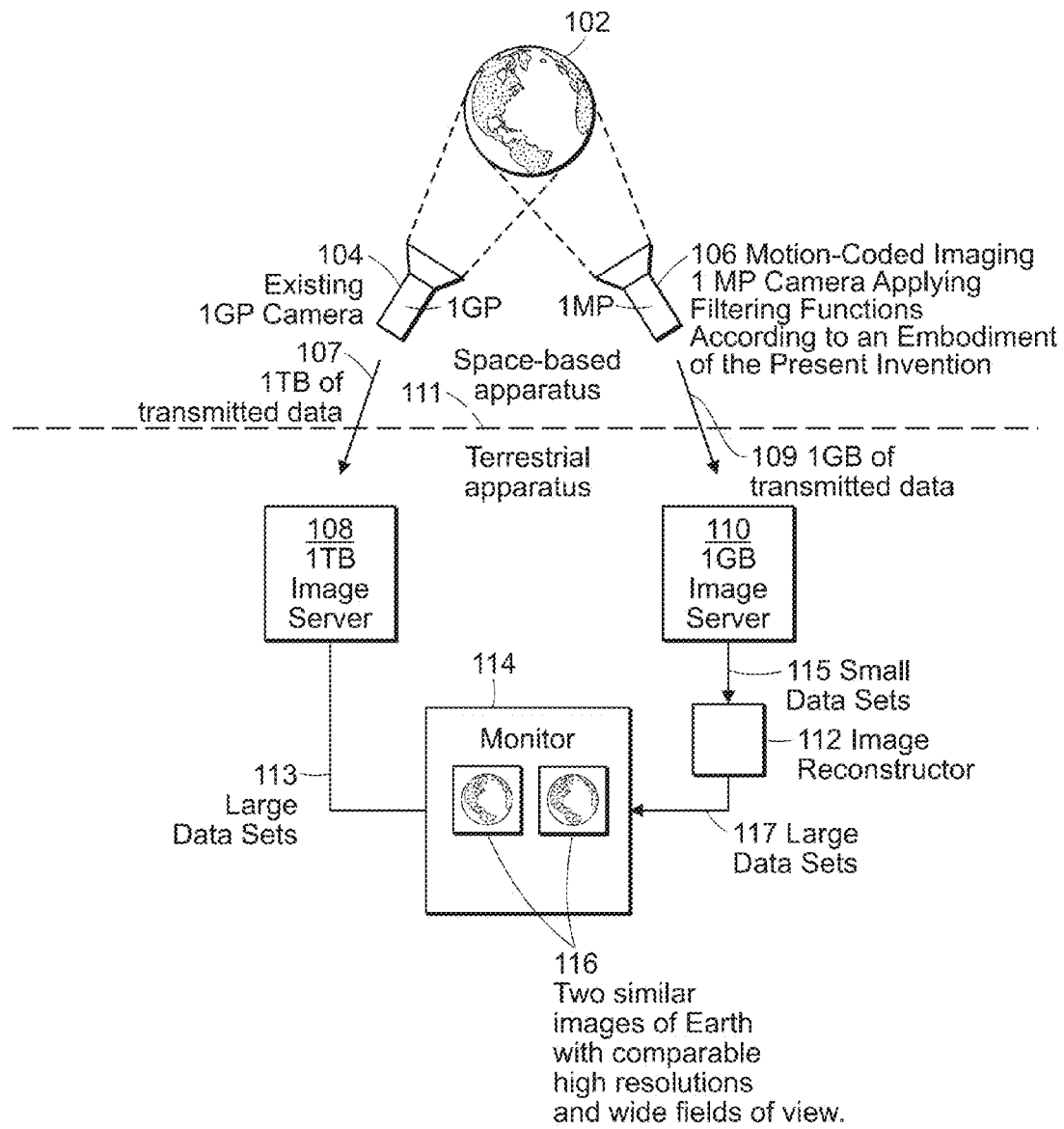
FIG. 1 is a schematic drawing comparing a prior art imaging system with an imaging system according to an embodiment of the present invention.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

FIG. 1 is a schematic diagram comparing an existing imaging system with a motion coded imaging system applying spatial filtering functions according to an embodiment of the present invention. A space-based existing camera 104 with a 1 gigapixel (GP) sensor is configured to view the Earth 102. An arrow 107 represents 1 terabyte (TB) of data from the existing camera 104 transmitted to a terrestrial image server 108, which has a 1 TB storage capacity accommodating multiple images from the 1 GP camera 104. A line 111 in FIG. 1 indicates a division between space-based apparatus, including the existing camera 104, and terrestrial apparatus, including the image server 108. The image server 108 sends large data sets 113 to a monitor 114, which displays a high-resolution, wide-field image 116 of the Earth 102 based on the large data sets.

Also shown in FIG. 1 for comparison is a motion coded imaging camera 106 with a 1 megapixel (MP) sensor according to an embodiment of the present invention. The motion coded imaging camera 106 is also configured to view a comparable portion of the Earth 102. An arrow 109 represents of data from the camera 106 transmitted to a terrestrial image server 110, which requires a storage capacity of only 1 GB to accommodate data representing multiple images. It should be understood that the 1 MP sensor, 1 GB transmitted data, and 1 GB storage capacity are representative values and can vary in other embodiments based on imaging equipment, transmission requirements, available storage, and imaging fidelity requirements. The representative values shown in FIG. 1 illustrate the advantage that data storage and transmission capacity requirements can be dramatically reduced in comparison with existing imaging systems.

Furthermore, embodiments of the current invention can have particular advantages for high-resolution systems such as those shown in FIG. 2, eliminating a need for GP-class sensor arrays.

An arrow 115 represents small data sets including coded images sent by the image server 110 to an image reconstructor and based further on coding information (not shown). The coding information can be stored in the image reconstructor 112 or sent to the image reconstructor 112 from the motion coded imaging camera 106, for example. The arrow 117 represents large data sets comparable to the large data sets 113 in size and including a second image 116 of Earth with high resolution and wide field of view, and the second image 116 is also shown on the monitor 114.

Illustrated further in FIG. 1 are some of the advantages of the present invention over existing camera systems. For example, existing camera systems for acquiring high-resolution images with wide fields of view often require high-pixel-count sensors, such as the 1 GP sensor in the existing camera 104. Such sensor arrays can be very costly or simply unavailable, and manufacturing yields can be a concern, especially where the imaging wavelengths are outside the visible range, such as in thermal or infrared imaging. Large-pixel, high-pixel-count sensors can become impractically large at a gigapixel scale (e.g., 0.5 m). On the other hand, small-pixel, high-pixel-count sensors can suffer from low sensitivity relative to the performance achievable with a large-pixel array.

In contrast to existing systems, cameras configured as described in the present disclosure can utilize much smaller sensor arrays, such as the 1 MP sensor array in the camera 106, while still maintaining high resolution. Further, sensor arrays can be even much smaller than 1 MP for many applications, as described hereinafter in conjunction with FIGS. 2C and 5C. Smaller sensor arrays, such as the 1 MP array of the camera 106, can be much less costly than larger sensor arrays like the 1 GP array in the camera 104. Furthermore, devices described herein can be relatively insensitive to defective pixels, so manufacturing yields and subsequent pixel failures can be even less problematic. As described hereinafter, measurements obtained by individual pixels can relate to coefficients for basis functions used to represent an image of the scene. Such coefficients and basis functions need not all be used in image reconstruction.

Embodiments can achieve wide field of view, higher pixel sensitivity, and faster temporal sampling. One way to achieve higher sensitivity and faster temporal sampling is to use an avalanche photodiode (APD) array having a pixel size of 15 μm, for example, instead of a CMOS or CCD array having pixel size of 1-24 μm, for example. While the combined cost of the 1 GP camera 104 and 1 TB image server 108 may be very high, the combined cost for the 1 MP motion coded imaging camera 106, 1 GB image server 110, and the image reconstructor 112 can potentially dramatically less, especially for IR imagers.

Figure 2A:
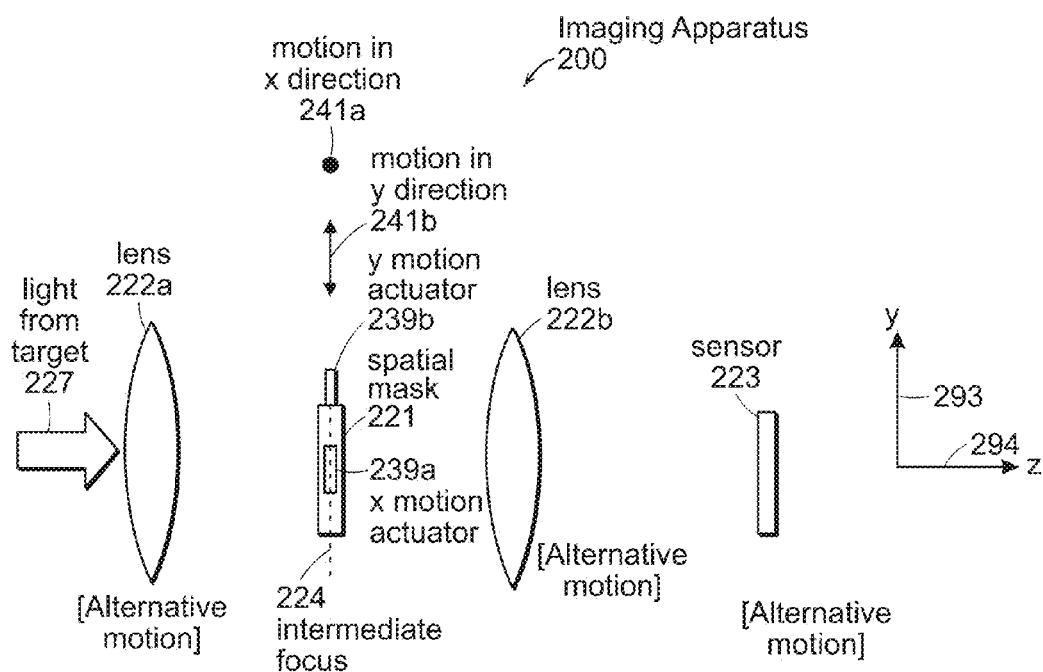
FIG. 2A illustrates an imaging apparatus according to an embodiment of the present invention.

FIG. 2A illustrates an embodiment imaging apparatus 200. The apparatus 200 includes lenses 222a and 222b and a sensor array 223. The lenses 222a and 222b are configured to produce an encoded image of a target scene (not shown) that can be sensed at the sensor array 223. A Walsh Hadamard spatial mask is situated between the lenses 222a and 222b at an intermediate focal plane 224 of the optics. As illustrated in later figures, the spatial mask 221 includes various adjacent mask features defining a pitch and implementing different spatial filtering functions. Light 227 from the target scene to be encoded is focused by the lens 222a and comes into focus at the intermediate focal plane 224, where the spatial mask 221 is situated. In other embodiments, such as the imaging apparatus 600 described later in conjunction with FIG. 6B, one or more optics of an imaging apparatus can be configured to produce an encoded image of the scene at an array of sensor elements without an intermediate focal plane. A design without an intermediate focal plane has an advantage of being potentially more compact. However, in embodiments with an intermediate focal plane, such as the focal plane 224 in FIG. 2A, a spatial mask can potentially be configured to work with an off-the-shelf imaging apparatus. An X motion actuator 239a applies motion 241a to the spatial mask in the X direction. Similarly, a Y motion actuator 239b applies motion 241b to the spatial mask 221 in the Y direction. By the X and Y motions 241a and 241b, different filtering functions implemented by adjacent mask features of the spatial mask 221 are applied to the light 227 from the target scene to produce an optically encoded image of the scene. The filtered light from the target is then further focused by the lens 222b onto the sensor array 223, which is configured to sense the encoded image of the scene.

While the imaging apparatus 200 applies different filtering functions by causing the spatial mask 221 to move, in other embodiments, the different spatial filtering functions are applied by moving sensor array or another optical element with respect to other elements of an imaging apparatus. In yet another example, a scanning polygonal mirror (not shown) can be used to scan light from the scene over different spatial mask elements of the spatial mask.

Further, the spatial mask 221 can be arranged to apply the different spatial filtering functions without motion of optical elements of the imaging apparatus with respect to one another. This can be done by relying on motion of the imaging apparatus as a whole with respect to a target scene to be imaged (not shown). For example, where a coded imaging apparatus such as the imaging apparatus 200 is mounted in a satellite such as the small satellite 345 described hereinafter in conjunction with FIG. 3, motion of the coded imaging apparatus itself with respect to the scene to be encoded is sufficient to apply the different filtering functions to light from the target scene, and optical components of the imaging apparatus can be fixed or stationary with respect to each other. This principle can also apply to a coded imaging apparatus mounted on a moving aircraft, for example. Advantageously, these embodiments need not have camera parts moving with respect to one another, potentially increasing reliability and decreasing cost.

A Y-axis 293 and Z-axis 294 show a physical orientation of the imaging apparatus 200. Namely, the lenses 222a-b, the spatial mask 221, and the sensor array 223 are oriented parallel to an X-Y plane formed by the Y-axis 293 and an X-axis (not shown). It should also be noted that the lens 222a serves as a single aperture configured to receive the light 227 from the target or target scene, and through which the light from the scene or target to be encoded and imaged is transmitted to the spatial mask 221 for application of different spatial filtering functions to the light from the scene. Namely, light from the target to be imaged at the intermediate focus 224 passes through the single lens 222a, rather than through an array of objective lenses passing light from the scene onto different mask features or different portions of a sensor array. In other words, there is only one aperture, namely the single lens aperture 222a, that is configured to receive light from the scene for encoding the scene. Each coded image or filtered measurement of the scene that is produced by the spatial mask 221 and detected by the sensor 223 can represent a coded measurement of the entire target scene instead of only part of the scene.

Motion actuators or transducers can include ceramic actuators, voice coils, acousto-mechanical actuators, or piezoelectric transducers (PZTs), for example. Actuators may be configured to drive the spatial mask or other optical component directly, or they may be coupled to the mask via a mechanical amplifier or other linkage, for example.

As also shown through FIG. 2A, a Walsh Hadamard spatial mask 221 can be situated at an intermediate focus 224 (i.e. intermediate focal plane) of the imaging apparatus and between lenses of the imaging apparatus.

Figure 2B:
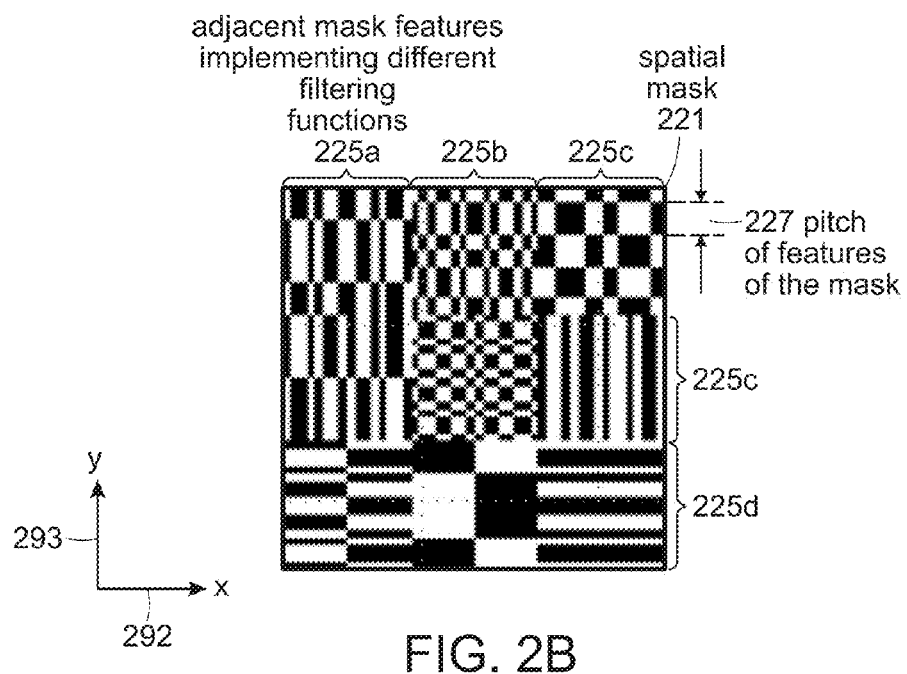
FIG. 2B illustrates a spatial mask that can be used as part of the imaging apparatus of FIG. 2A.

FIG. 2B illustrates in greater detail the Walsh Hadamard spatial mask 221 used in the imaging apparatus 200. The spatial mask 221 has mask features 225a and 225b implementing the different filtering functions of the spatial mask 221 adjacent along an X axis 292. Further, other mask features 225c and 225d implementing other filtering functions of the mask 221 are adjacent along the Y-axis 293. In other embodiments, the mask features can be adjacent along axes that are not perpendicular to each other. Moreover, the mask features need not be immediately next to each other to be adjacent. For example, the mask features 226a are adjacent to mask features 225c as well as to the mask features 225b. Different filtering functions corresponding to the different mask features can be applied in various sequences and do not have to be applied in the order in which they are placed in a given spatial mask. It should be pointed out that although the spatial mask 221 is referred to as a "mask" herein, the adjacent mask features such as 225a-b and 225c-d can also each be referred to as a "mask". Thus, spatial mask 221 can also be referred to as an array of spatial masks.

The features of 225c of the spatial mask 221 define a pitch 227 of features of the mask. Pitches (not shown) defined by other features of the mask 221 can be different for each set of features of the mask implementing a different filtering function. In some cases, a smallest pitch of the features implementing the different spatial filtering functions is approximately equal to an optical diffraction limit of the apparatus 200. An optical diffraction limit of the imaging apparatus 200 is described hereinafter in conjunction with FIG. 2D. Because the lens 222a in FIG. 2A serves as a single aperture for receiving light 227 from the target scene to be encoded by filtering, and because the spatial mask 221 has mask features implementing nine different spatial filtering functions, the apertures are fewer in number than the different filtering functions implemented by the spatial mask 221.

Figure 2C:
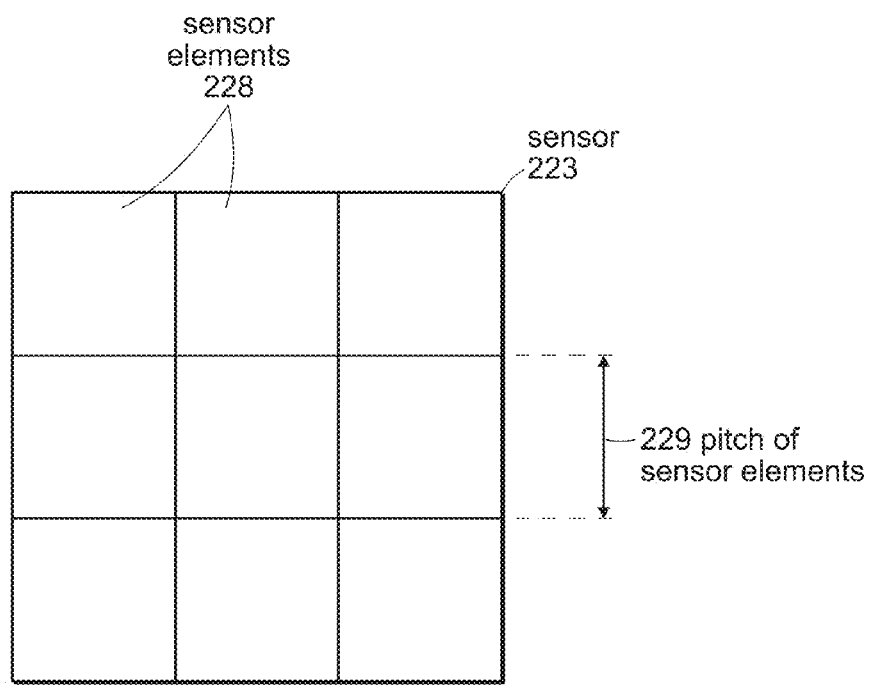
FIG. 2C illustrates a sensor array that can be used with the imaging apparatus of FIG. 2A.

FIG. 2C illustrates in greater detail the sensor array 223 of the imaging apparatus 200, which is configured to sense filtered light from the target scene to be encoded. The sensor array 223 has sensor elements 228, which define a pitch 229. One advantage of embodiments of the present invention is that sensor elements need not have a pitch on the order of the size of an optical diffraction limit of the system. Instead, a size or pitch of the sensor elements can be significantly larger than an optical diffraction limit of the apparatus. Thus, while the CCD and CMOS detectors used in existing apparatuses can have pixel sizes of 1-24 µm, for example, sensor arrays consistent with those described herein can utilize avalanche photodiodes (APDs) with a pitch of 15 µm, for example. Furthermore, with appropriate selection of mask features to be applied to the scene, or to be applied to light from the scene, encoded images produced by spatially filtering light at the spatial mask 221 and sensed or detected as encoded images or measurements of the scene at the sensor array 223 can be made available and used for reconstruction of an image of the scene with higher spatial resolution than the pitch 229 of the sensor elements would otherwise permit for uncoded images. For example, spatial patterns can be made at a sub-micron scale using lithographic techniques applied to either a mask at an intermediate focus, as in FIGS. 2A-2B or to a metallic pattern on the pixels (or sensor elements) themselves, as described later in conjunction with FIGS. 6A-6B. The ability to use APD sensor elements can also bring additional advantages, including increased sampling speed, increased light sensitivity, and zero read noise, as understood in the art.

The sensor array in FIG. 2C has nine sensor elements 228, but other embodiments have other numbers of sensor elements or pixels, the 1 MP camera 106 in FIG. 1 being such an example.

Figure 2D:
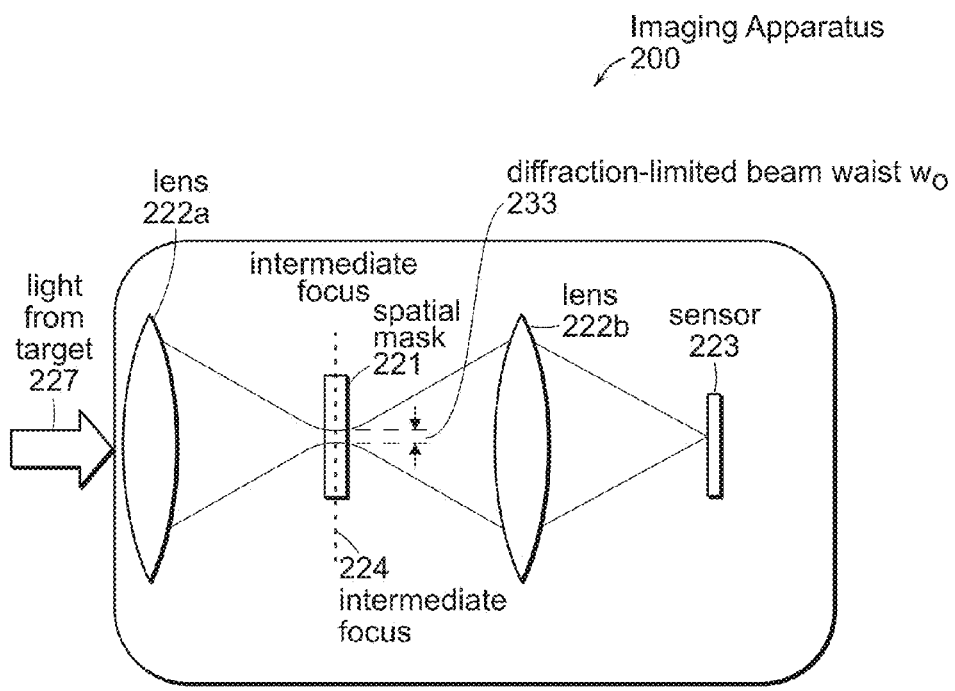
FIG. 2D illustrates a diffraction limit of optical elements of the apparatus of FIG. 2A.

FIG. 2D illustrates a portion of the imaging apparatus 200 shown in FIG. 2A, along with a diffraction limit of optical elements of the apparatus. In particular, the light 227 focused by the lens 222a converges to a diffraction-limited beam waist $w_o$ 233 at the intermediate focal plane 224, where the spatial mask 221 is situated.

In the imaging apparatus 200, the smallest pitch of the mask features in the spatial mask 221 shown in FIG. 2B is approximately equal to the optical diffraction limit 233 shown in FIG. 2D. However, in other embodiments, the smallest pitch of the features of the spatial mask can be larger than an optical diffraction limit of the apparatus, depending on image resolution needs. The smallest pitch of the features of the spatial mask can also be smaller than an optical diffraction limit of the apparatus, but having the spatial mask pitch smaller than an optical diffraction limit of the apparatus may not increase resolution of the reconstructed image. The size of the sensor elements 228 shown in FIG. 2C can be comparable to the pitch 229 of the sensor elements and can be larger than the optical diffraction limit 233 shown in FIG. 2D.

Figure 2E:
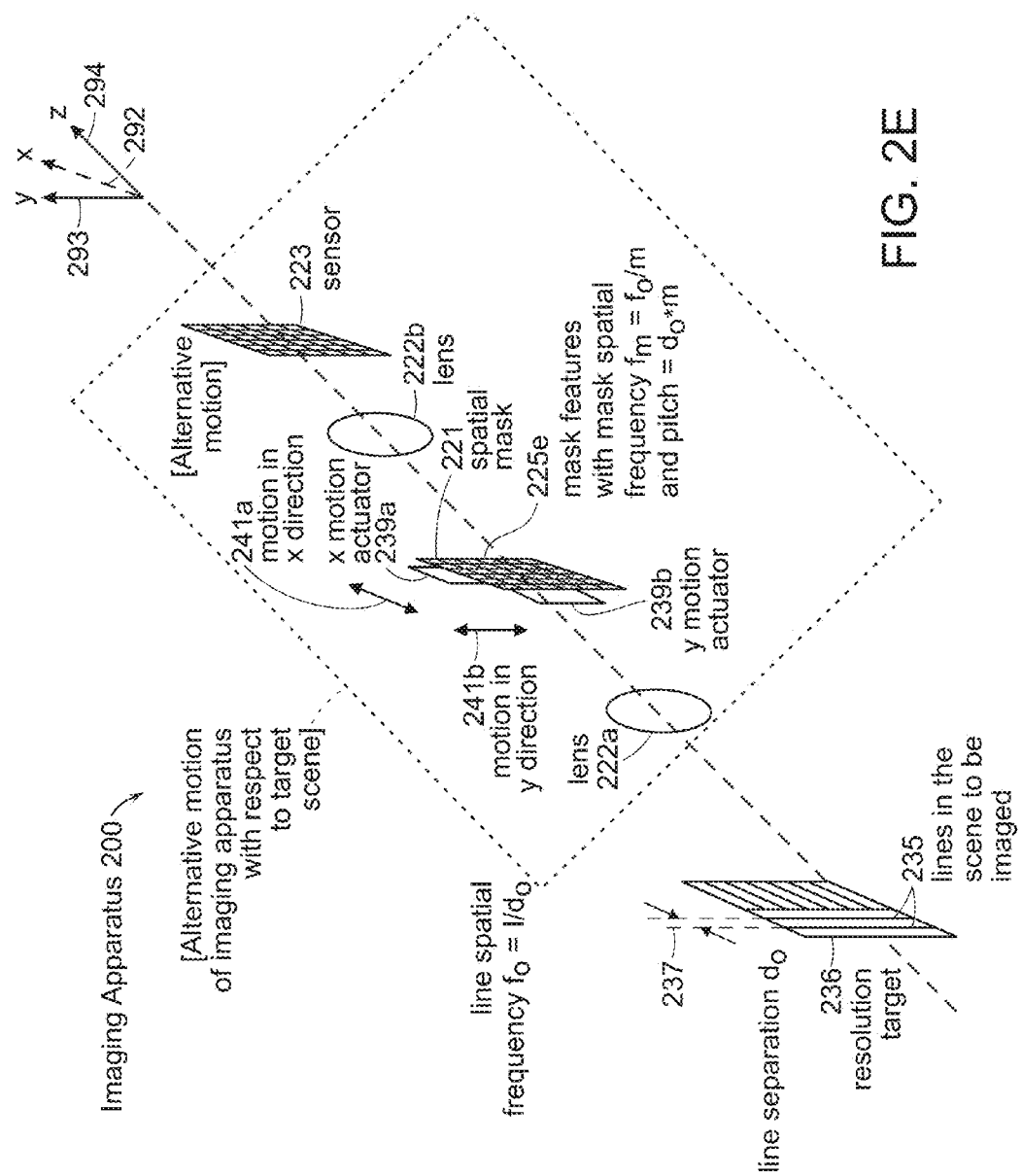
FIG. 2E is a perspective drawing of the imaging apparatus of FIG. 2A, the apparatus being arranged to image a scene with trees.

FIG. 2E is a perspective drawing of the imaging apparatus 200 arranged to image lines 235 of a resolution target 236. In FIG. 2E, the resolution target 236 is the scene to be imaged, but in other cases, the scene to be imaged can be a natural scene, for example. The lines 235 have line separation 237 $d_o$, with a corresponding object spatial frequency $f_o=1/d_o$. The features of the spatial mask 221 include mask features 225e with mask spatial frequency $f_m=f_o/M$ and pitch=$d_oM$. FIG. 2E demonstrates how mask features implementing the different spatial filtering functions can be selected to correspond to expected spatial characteristics in the scene to be imaged. For the resolution target scene in FIG. 2E, for example, a set of lines 235 are known to have the line separation $d_o$. Note that M is the magnification of the lens 222a. Thus, a filtering function corresponding to mask features with a mask spatial frequency $f_m$ is particularly important in reconstructing an image of the line 235.

Further, other mask features can be configured to have spatial frequencies corresponding to other characteristics in the scene to be imaged, such as other spatial frequencies. For a natural scene with trees, for example, other mask features can have mask spatial frequencies corresponding to average dimensions of leaves of the trees, trunks of the trees, or average leaf separations. Furthermore, the different filtering functions implemented by the different features of the spatial mask 221 can be basis functions representing high-energy functional coefficients corresponding to information in the scene, such as spatial frequencies.

In the imaging apparatus 200, the spatial mask is passive in that the different filtering functions are fixed filtering functions. In other words, the features of the spatial mask implementing the different filtering functions of the spatial mask 221 do not change with time. However, in other embodiments, the spatial patterns in the spatial mask are adjustable, and they can be chosen dynamically based on characteristics of the scene to be imaged, features of the scene that are desired to be enhanced, or a desired imaging resolution, for example.

In systems in which the spatial patterns of the mask are adjustable, the imaging apparatus can also include an optional spatial pattern controller (illustrated in FIG. 2F) in operative communication with the mask to cause the mask to adjust the spatial patterns. One example of an adjustable mask with adjustable spatial patterns includes an LCD device working in conjunction with the spatial pattern controller. The spatial pattern controller changes a pattern implemented by the LCD according to expected characteristics of a scene to be imaged, such as a natural scene. Light from the scene to be imaged passes through the LCD spatial mask, and thus different filtering functions corresponding to LCD features are applied to the scene to be imaged.

It should also be understood that in other embodiments, a spatial mask can be further passive in the sense of being fixed with respect to other parts of an imaging apparatus and not being driven by an actuator. Moreover, in some embodiments, motion can be applied to the imaging apparatus itself with respect to a scene to be encoded, and this motion can be used in applying the different filtering functions, and optical components of the imaging apparatus can be fixed, or stationary, with respect to each other. In the embodiment shown in FIG. 2E, alternative motion of the imaging apparatus itself would include collective motion of the lenses 222a-b, spatial mask 221, and sensor 223 with respect to the resolution target scene 236.

Even in embodiments in which the spatial mask is fixed with respect to other parts of an imaging apparatus and not being driven by an actuator, and where there is no other motion of optical components of an imaging apparatus, the motion of the imaging apparatus itself with respect to the scene to be imaged can be relied upon to apply the different spatial filtering functions. For example, in FIG. 2E, it should be pointed out that if the imaging apparatus 200, which includes the lens 222a, a special mask 221, the lens 222B, and the sensor 223 had no actuators such as the actuators 241a-b, and if all the optical components were otherwise fixed with respect to each other, then motion of the imaging apparatus 200 itself with respect to the scene to be imaged could be relied upon. This can be understood by noting that if the optical components were fixed with respect to each other, yet the imaging apparatus were moved with respect to the scene (resolution target 236 in the case of FIG. 2E), light from a given point of the scene would be incident at different points of the spatial mask 221, or at different mask features 225e. Thus, different filtering functions would be applied to the scene upon motion of the imaging apparatus 200. A further way to understand the effect of motion is that a given filtering function associated with the mask can be applied to the scene at least twice, with the two or more applications being non-redundant due to the motion.

Figure 2F:
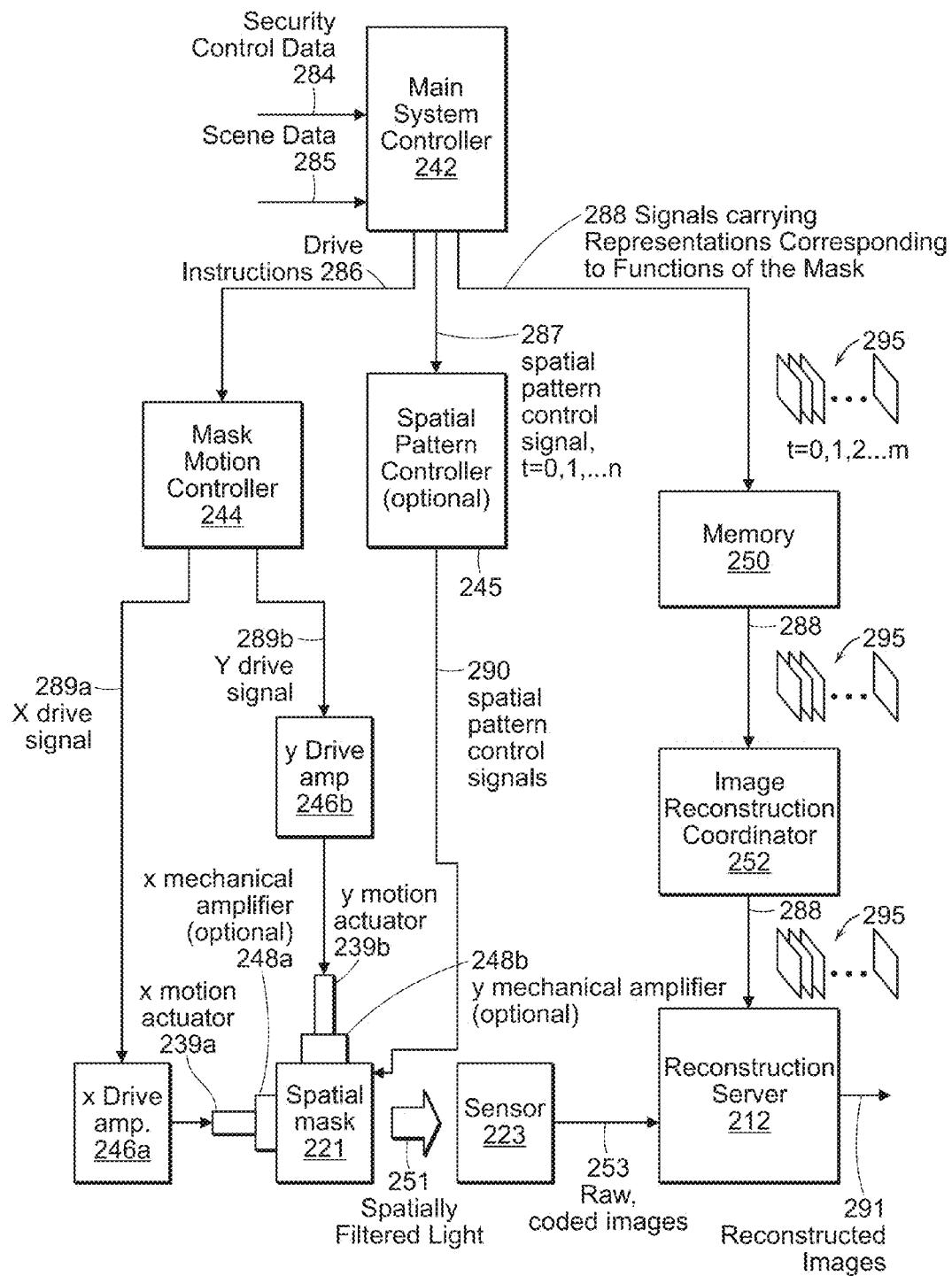
FIG. 2F is a block diagram illustrating control systems used in the imaging apparatus of FIG. 2A.

FIG. 2F is a block diagram illustrating control systems used in the imaging apparatus 200 and how they are interconnected with the apparatus. A main system controller 242 receives security control data 284 and scene data 285. The security control data 284 allows the main system controller 242 to optionally adjust the spatial mask 221 to implement different filtering functions based on security needs. For example, the motion of the spatial mask 221 can be changed to apply different filtering functions of the mask or to optionally change the features of the spatial mask to apply different filtering functions. Automatic changes may be made periodically, or changes may be made in response to security needs arising at a given time in order to maintain image data security. While encoded measurements from light filtered by the spatial mask do not depict the scene in the same way as unfiltered images, an image of the scene can be reconstructed from the encoded measurements if the basis functions of the spatial mask 221 are known. Therefore, it can be helpful to change the basis functions applied by the spatial mask 221 or to adjust the order in which they are applied to images of the scene.

The scene data 285 received at the main system controller 242 can also help the main system controller 242 determine which spatial filtering functions to apply to images of the scene. For example, if the object separation 237 in FIG. 2E is not initially known, various filtering functions may be applied initially by the spatial mask 221, from which it can be determined which filtering functions result in high-energy functional coefficients for the scene. This information about high-energy coefficients can then be provided as scene data 285 to the main system controller 242, which can adjust the motion of the spatial mask 221 to apply filtering functions corresponding to higher energy spatial frequencies for the scene.

The main system controller 242 controls the motion of the spatial mask 221 by sending drive instructions 286 to a mask motion controller 244. The mask motion controller 244 sends X drive signals 289a to an X drive amplifier 246a, which drives the X motion actuator 239a, which is mechanically linked to the spatial mask 221. The mask motion controller 244 also sends Y drive signals 289b to a Y drive amplifier 246b, which drives the Y motion actuator 239b, which is mechanically linked to the spatial mask 221. The X and Y motion actuators 239a-b can be optionally linked to the spatial mask 221 through X and Y mechanical amplifiers 248a and 248b, respectively. Such mechanical amplifiers can be used, for example, where the X and Y motion actuators 239a-b are piezoelectric transducers (PZTs), for example, or otherwise where motion ranges of the actuators are smaller than a required travel range for the spatial mask 221.

Where the spatial patterns in the spatial mask 221 are adjustable, the main system controller 242 can send spatial pattern control signals 287 to an optional spatial pattern controller 245. The spatial pattern controller 245 is in operative communication with the spatial mask 221 through spatial pattern control signals 290. The spatial pattern control signals 290 cause the mask features, such as the features 225a-d shown in FIG. 2B, to change based on security needs, or known characteristics of the scene, such as spatial frequencies, for example.

The main system controller 242 also sends signals 288 carrying representations 295 corresponding to functions implemented by the spatial mask 221. The representations 295 can be arrays of values indicating a set of basis functions of the spatial mask for various motion coded measurements of the scene taken at times T=0, 1, 2, . . . m, for example. The representations 295 can be stored in memory 250. When the memory 250 includes the representations 295 corresponding to the basis functions of the spatial mask 221, an image reconstruction coordinator 252 can read the representations 295 from the memory 250 and forward the representations to a reconstruction server 212. After the spatial mask 221 applies filtering functions to one or more images of the scene, spatially filtered light 251 proceeding from the spatial mask 221 is focused onto the sensor 223. The sensor 223 sends raw coded measurements 253 to the reconstruction server 212. Based on the raw, coded measurements 253 and the representations 295 corresponding to functions of the spatial mask 221, the reconstruction server 212 outputs reconstructed images 291.

One advantage of the imaging apparatus 200 is that even if the reconstructed images 291 are of high resolution with a large field of view and include large data sets, the raw, coded images 253 can include very small data sets. Thus, if the sensor 223 is located in a satellite or other remote location, such as the camera 106 in FIG. 1, and if the reconstruction server 212 is terrestrial, like the image reconstructor 112 in FIG. 1, then relatively little data capacity is necessary to transfer the raw encoded measurements 253 between the sensor and reconstruction server.

FIG. 3 schematically illustrates an imaging apparatus 300 and its incorporation into a satellite 345. The coded imaging device 300 is configured to view a scene 347 on the earth 102. Light 327 from the target scene is focused by a lens 322a onto a binary spatial mask 321 (shown in greater detail in FIG. 3A) situated at an intermediate focal plane 324 of the optical system. The binary spatial mask 321 has various spatial features, the smallest pitch of which is ¼₀₀₀ of a size of the sensor elements of a sensor array 323. The sensor array 323 includes 1 million APD sensor elements. A megabyte datastream 353 is sent from the sensor array 323 to an image reconstructor 312, which processes the encoded measurements. The image reconstructor 312 outputs a gigapixel image 347 covering a wide field of view and having high resolution. A small section 349 of the image 347 is shown in greater detail in FIG. 3B to demonstrate the high resolution capability of the imaging apparatus 300.

Figure 4A:
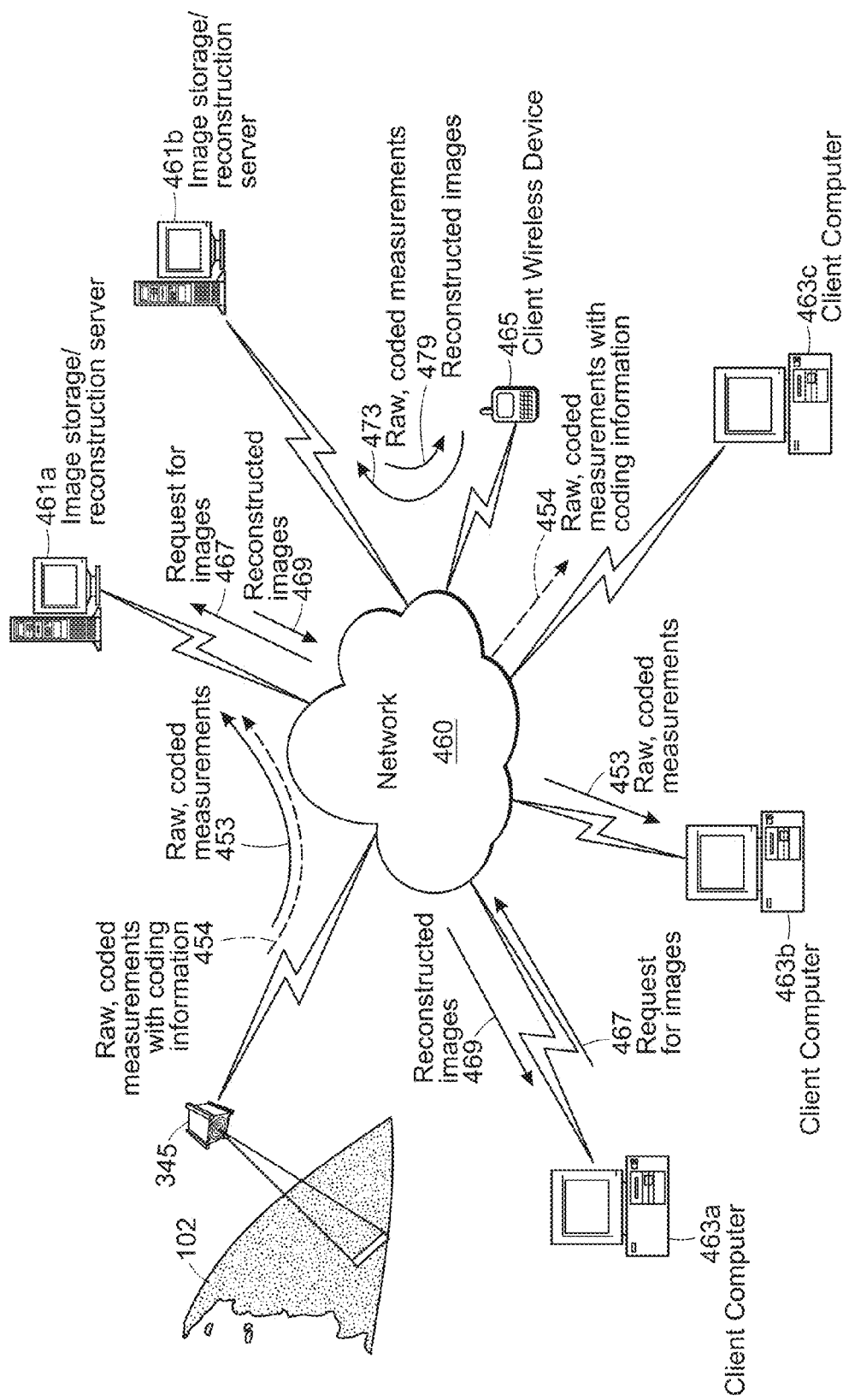
FIG. 4A is a schematic illustration of a network environment in which the satellite-based imaging apparatus of FIG. 3 can be deployed.

FIG. 4A schematically illustrates a network environment 460 in which the imaging apparatus of FIG. 3 can be deployed. The satellite 345 acquires motion coded measurements of images of the Earth 102. The satellite 345 can forward raw, coded measurements 453 through the network 460 to an image storage/reconstruction server 461a. The reconstruction server 461a can be configured to store coding information such as the representations 295 corresponding to functions of the spatial mask, shown in FIG. 2F. Alternatively, the satellite 345 can send raw coded measurements 454 with coding information, and the coding can be updated as necessary.

Client computers connected to a network such as the network 460 can request reconstructed images from a reconstruction server, or client computers can perform reconstruction themselves. For example, a client computer 463a connected to the network 460 sends a request 467 for images through the network 462 to the image storage/reconstruction server 461a. The reconstruction server 461a sends reconstructed images 469 to the client computer 463a. A client computer 463b, in contrast to the client computer 463a, stores coding information and receives raw, coded measurements 453 directly from satellite 345 through the network 460. The client computer 463b then reconstructs the images 347 of the Earth at the point of use. In yet another variation, a client computer 463c receives the raw, coded measurements 454 with coding information directly from the satellite 345 through the network 460. The client computer 463c, like the client computer 463b, reconstructs the images 347 of the Earth at the point of use.

Also illustrated in FIG. 4A is use of a terrestrial motion coded imaging device, namely a client wireless device 465. The wireless device 465 also contains an apparatus for motion coded imaging (not shown), and the wireless device 465 sends raw coded measurements 473 to an image storage/reconstruction server 461*b* through the network 460. The reconstruction server 461*b* stores representations corresponding to functions of a spatial mask (not shown) in the client wireless device 465. Based on the raw coded measurements 473 and the stored coding information, the image storage/reconstruction server 461*b* sends reconstructed images 479 to the wireless device 465. In this way, a server such as the server 461*b* can remotely reconstruct images and produce high-resolution, wide-field-of-view, reconstructed images to a mobile device such as the wireless device 465 based on dramatically reduced uploaded data.

Further benefits can be obtained in a network environment such as the network 460 where further compression is applied at imaging devices such as the satellite 345 and the client wireless device 465. These benefits and deficiencies can be understood by reference to existing image compression methods. State-of-the-art image compression methods typically consist of a linear and a nonlinear stage. The first linearly transformed an image, projecting it onto a different basis set than the pixel basis. For example, in JPEG image compression, the image is broken into blocks, and then a direct cosine transform (DCT) is performed on each block. The result of the DCT transform is new basis coefficients that are compressed via a nonlinear processing stage called "entropy coding." The combination of the linear and nonlinear stages can yield high compression ratios, while maintaining good image quality.

In embodiments of the current invention, a linear basis projection stage can be performed in the analog by applying the different spatial filtering functions via the spatial mask, constituting an analog optical linear transformation to a basis set differing from the pixel basis. Each pixel or sensor element can be configured to address a particular block of the image, and the particular mask features in front of a given pixel describe the vector onto which the block is projected. The encoded measurement at the pixel or sensor element corresponds to a basis coefficient, which can then be nonlinearly compressed. If the sensor elements include significant electronics, some forms of nonlinear compression, such as quantization, can occur within the pixel. Thus, the combination of analog spatial projection masks and nonlinear digital processing could yield a compressed data stream, instead of a raw coded measurement data stream, and a given request for images and reconstructed image transfer, such as those shown in FIG. 4A, can be made even more efficient in terms of processing time, data transfer, and storage requirements. A processor in an image server or imaging apparatus can be configured to nonlinearly compress the basis coefficients, for example.

Figure 4B:
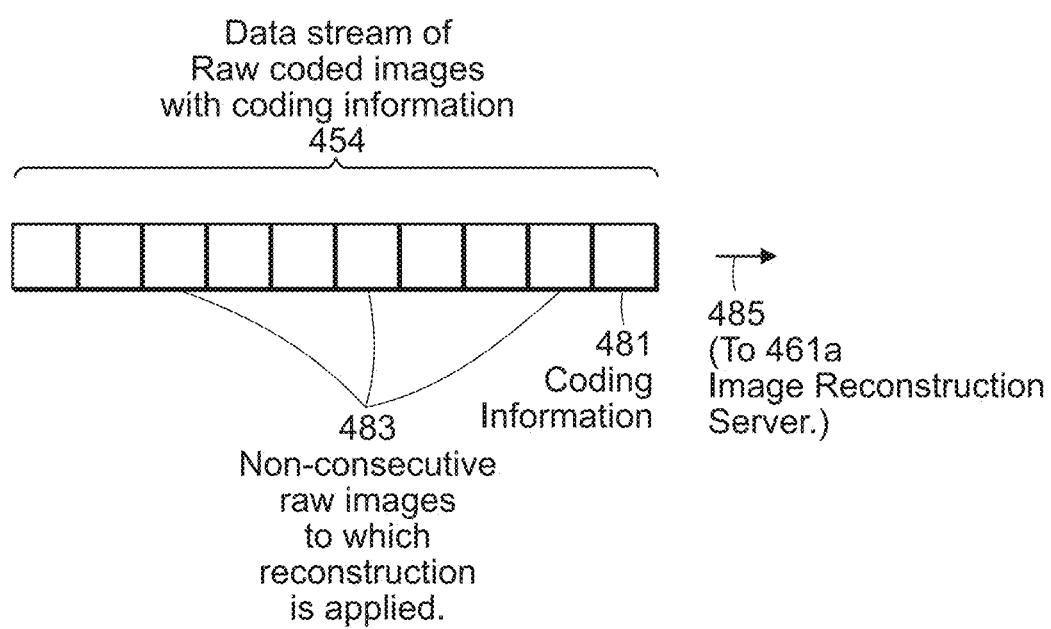
FIG. 4B illustrates an example data stream that can be transferred through the network shown in FIG. 4A.

FIG. 4B illustrates in greater detail the data stream 454 of raw, coded measurements with coding information from FIG. 4A. An arrow 485 shows the direction of transfer of the data stream 454 to the image reconstruction server 461*a*. The data stream 454 includes coding information 481 in a header of the data stream 454. The coding information 481 can include representations corresponding to filtering functions applied through the features of the spatial mask, such as the representations 295 shown in FIG. 2F. In the data stream 454, the coding information 481 applies to all images of the data stream. However, in other embodiments, different coding information can apply to each image.

Also illustrated in FIG. 4B is that an image processor, such as the image storage/reconstruction server 461*a* in FIG. 4A, can be configured to apply reconstruction to reconstruct an image based on a limited number of raw coded measurements, including non-consecutive raw images 483 in the data stream 454.

Figure 5A:
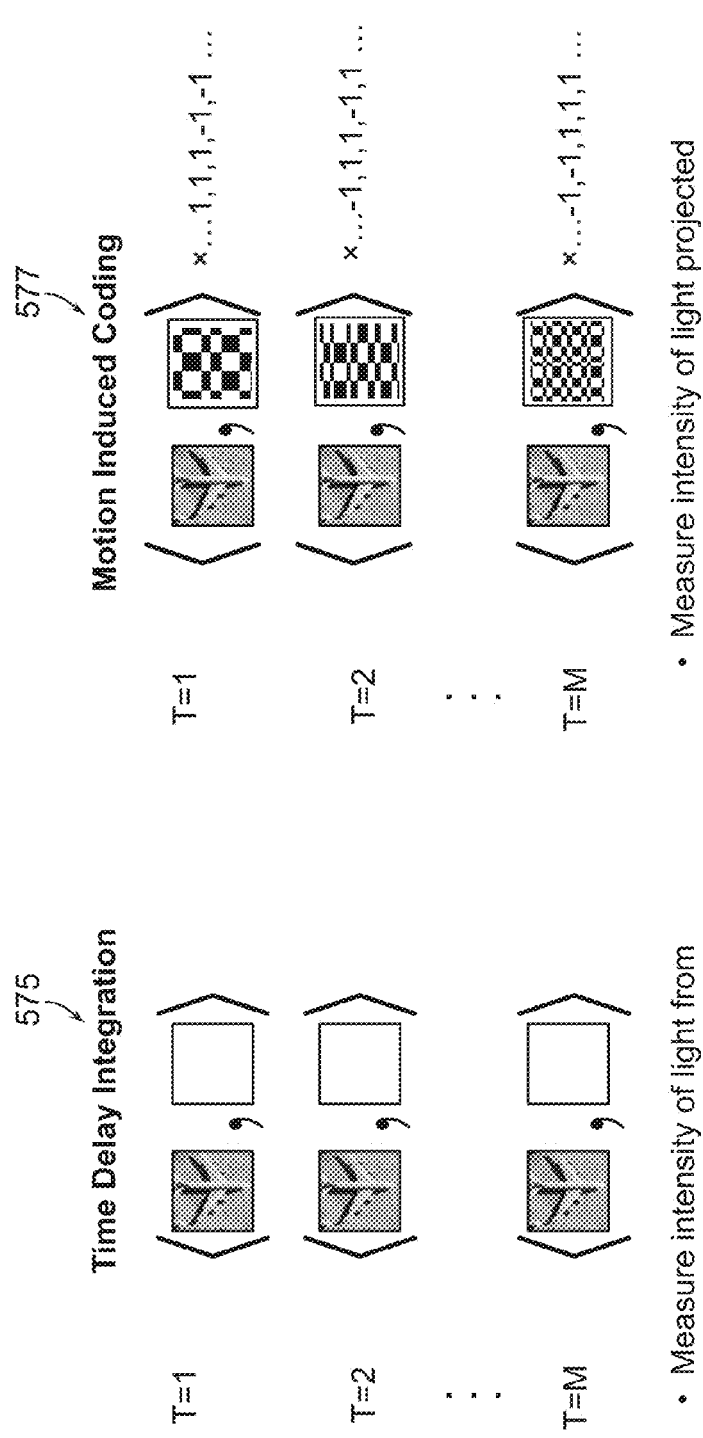
FIG. 5A illustrates differences between time delay integration according to prior art and motion induced coding according to embodiments of the present invention.

FIG. 5A compares and contrasts time delayed integration according to the prior art with simulated results of motion induced coding utilized by devices described herein. In time delayed integration 575, an intensity of light from a source is measured at times T=1, 2, 3, . . . M for a total of M times. Thus, intensity of light from a scene is measured at a pixel M times, and the M values for each pixel are summed to improve image quality limited by exposure time of a given image, for example.

Motion induced coding 577 is similar to the time delay integration 575 in at least one aspect. Namely, images are captured at different times T=1, 2, 3, . . . M. However, in contrast to the time delay integration 575, each image acquired by motion induced coding 577 is a filtered or coded image, or rather an encoded measurement of an image of the scene, and the pixel values of the coded measurements are not simply summed to produce a reconstructed image. Instead, for motion induced coding 577, a knowledge of the filtering functions represented by the various features of the mask can be used with the raw, coded measurements to reconstruct an image of the scene according to methods understood by those skilled in the art. The coding is motion induced because it involves using motion of an imaging apparatus or component thereof, such as a binary spatial mask, to spatially encode images of the scene using different filtering functions at different times. The result of processing the raw encoded measurements is a reconstructed image with resolution potentially much higher than would be otherwise possible with a given sensor array. Intensity of light projected onto M different binary masks is measured.

Referring to the motion induced coding 577, at time T=1, an image of the scene is filtered by a given binary mask having light and dark regions represented by values 1, 1, 1, −1, −1, for example. Between the times T=1 and T=2, the binary spatial mask is moved such that at time T=2, the image of the scene is filtered through a different set of binary features of the spatial mask represented by −1, 1, 1, −1, 1, for example. The quantity shown at 577, T=1 is a dot product or inner product representing the projection of the light onto the binary spatial mask shown at T=1. The encoded measurement resulting from applying the filtering function represented by the binary mask shown at T=1 is not part of a standard image in the sense of containing a representation of the scene that would normally be viewed. Instead, it is a filtered, or encoded measurement, and multiple such encoded or filtered measurements can be used to reconstruct a standard image of the scene.

Between the times T=2 and T=M, the binary spatial mask is further moved to apply one or more other filtering functions to the scene to be imaged. After applying M different spatial filtering functions to the scene to be imaged, a high-quality image of the scene can be reconstructed based on the M different filtered measurements, according to methods understood by those skilled in the art. It should be pointed out that while the coding or filtering is motion induced, the original scene shown at 577 is the same at times T=1, 2, 3, . . . M. Thus, it is not motion of a scene that is encoded; instead, motion is used to encode multiple images of the same scene spatially using various spatial filtering functions. When reconstruction is applied to the set M of encoded images, a reconstructed image can be created, the image having much higher spatial resolution than the imaging device could produce without coding. The higher resolution beyond the inherent capability of a pixel or sensor array can be referred to as spatial super-resolution.

Figure 5B:
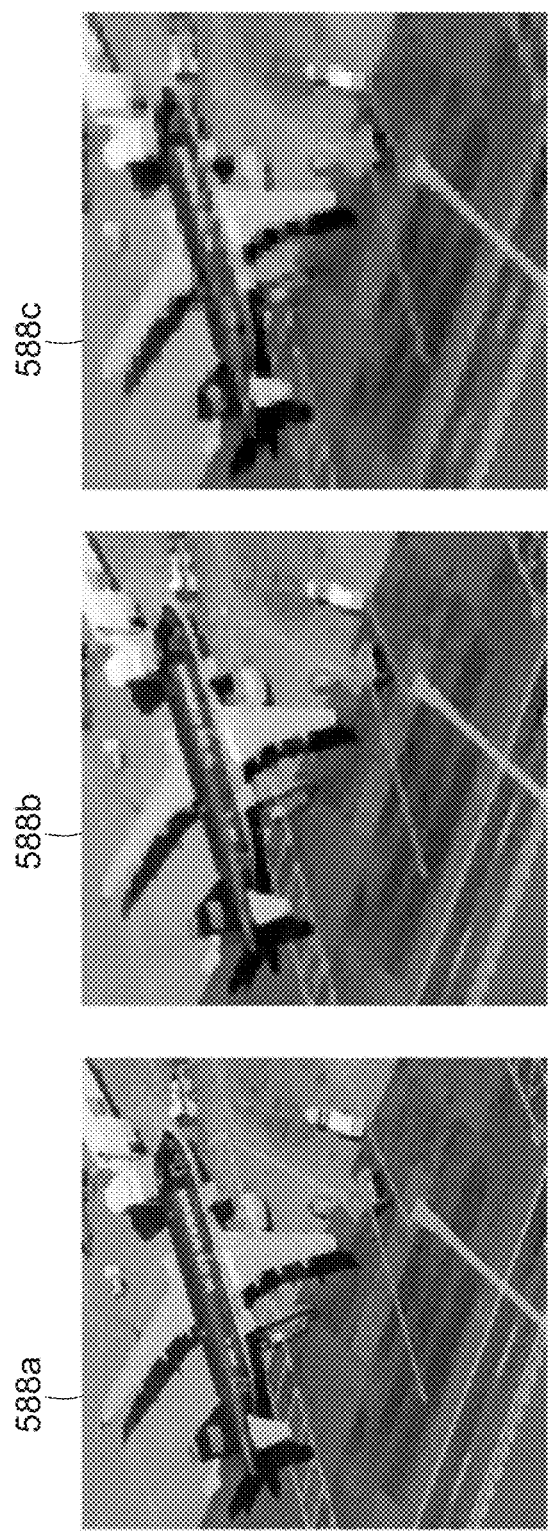
FIG. 5B includes images of a scene reconstructed according to an embodiment of the present invention with varying levels of reconstruction fidelity.

FIG. 5B demonstrates the results of a simulation showing the effect of different levels of reconstruction fidelity on the quality of image reconstruction at a given signal-to-noise (SNR) ratio of 30. The image 588*a* is an image reconstructed by applying relatively high-fidelity reconstruction. The high-fidelity reconstruction results from applying 256 different spatial filtering functions to images of the scene, followed by applying reconstruction based on those 256 different filtered images. The image 588*b* shows an image reconstructed using an intermediate level of reconstruction involving 128 spatially filtered images. The image 589*c* shows an image reconstructed using relatively low-fidelity reconstruction using only 64 spatially filtered images.

As can be seen in the images 588*a*, the reconstructed image quality generally increases with the number of filtering functions applied during reconstruction. Other reconstructions can include even higher or lower levels of reconstruction fidelity, depending on the need in a given application. Furthermore, reconstruction can be based on varying numbers of filtered images acquired using different filtering functions. For example, the images 588*a-c* can be obtained based on a set of 1000 acquired, raw filtered measurements. In the case of the image 588*a*, 256 of those 1000 raw, filtered measurements are used for reconstruction, while for image 588*c*, only 64 of the 1000 raw, filtered measurements are used. Thus, the level of reconstruction fidelity applied can be based on computing power of a reconstruction module (such as the reconstruction server 461*a* of FIG. 4A), available bandwidth for transferring raw or reconstructed images over a network (such as the network 460 in FIG. 4A), resolution required by a user, or other factors.

Figure 5C:
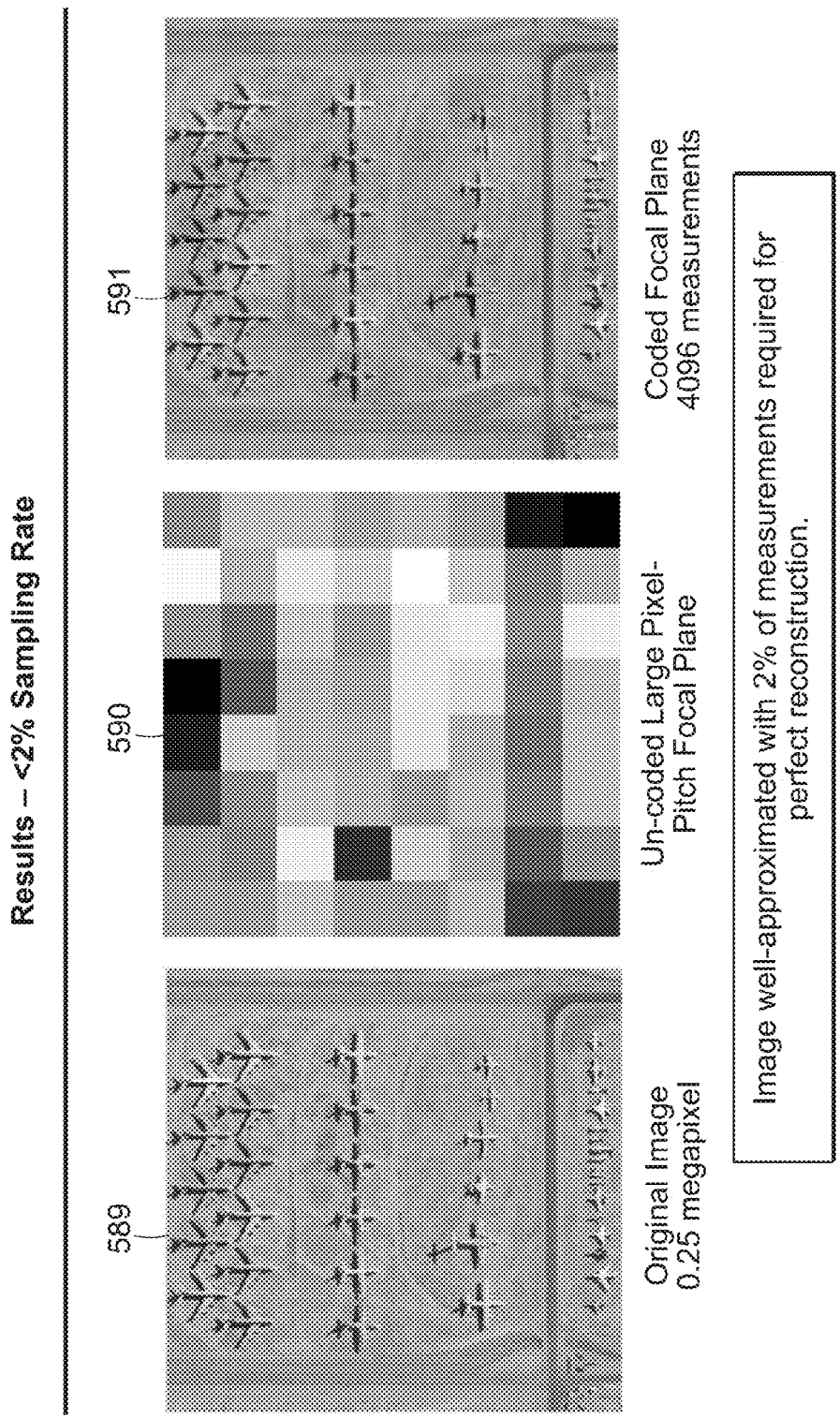
FIG. 5C is an illustration comparing an original image of a scene with an image of the scene reconstructed according to an embodiment of the present invention.

FIG. 5C is an illustration comparing an original image 589 with an image 591 acquired via reconstruction of simulated motion coded measurements. The image 589 is an original 0.25 MP image of a scene. An image 590 is shows an uncoded image of the same scene shown in image 589, acquired using an 8×8 sensor array having a large pixel pitch, or pitch of sensor elements. When 64 motion coded images of the scene are acquired (M=64) using the 8×8 (64 element) sensor array, a total of 64×64=4096 sensor measurements are acquired, compared with 250,000 sensor measurements for the original image. When image reconstruction is applied based on the 4096 measurements, the result is the reconstructed image 591, which is a very good representation of the original. Thus, an original image such as image 589 can be well approximated even with fewer than 2% of the number of measurements that would be required for perfect reconstruction. A comparison of the uncoded image 590 with the image 591 reconstructed from coded images also demonstrates that a sensor array with low resolution (or high pixel pitch) can be used to produce high-resolution images using motion coding of images of the scene.

The example shown in FIG. 5C also demonstrates the benefits of embodiments according to this disclosure in terms of data transfer and storage. Namely, by applying motion coding in imaging apparatuses as described herein, data transfers such as those shown at 109 and 115 in FIGS. 1 and 453-454 in FIG. 4A can be dramatically smaller. Further, data storage requirements in devices such as the image servers 110 (in FIG. 1) and 461*a-b* (in FIG. 4A) can be significantly reduced.

Figure 6A:
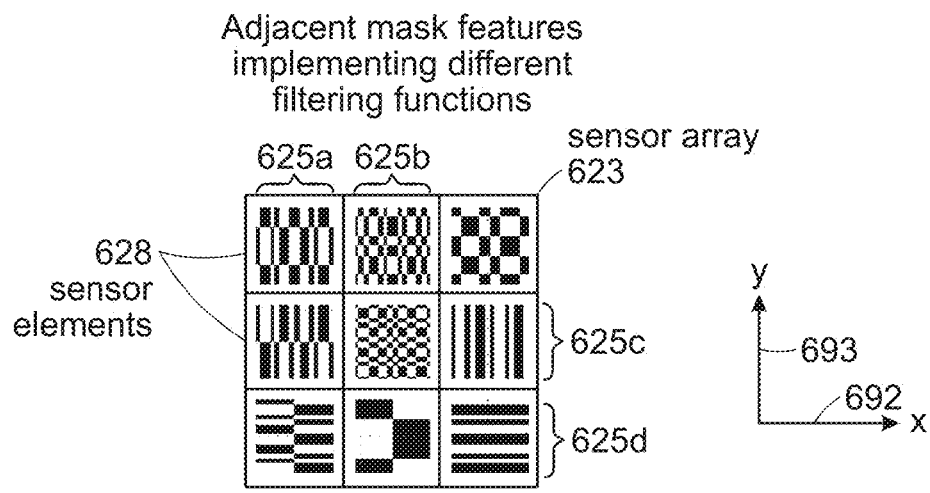
FIG. 6A illustrates an alternative sensor array according to an embodiment of the present invention having mask features applied directly to the sensor elements.
Figure 6B:
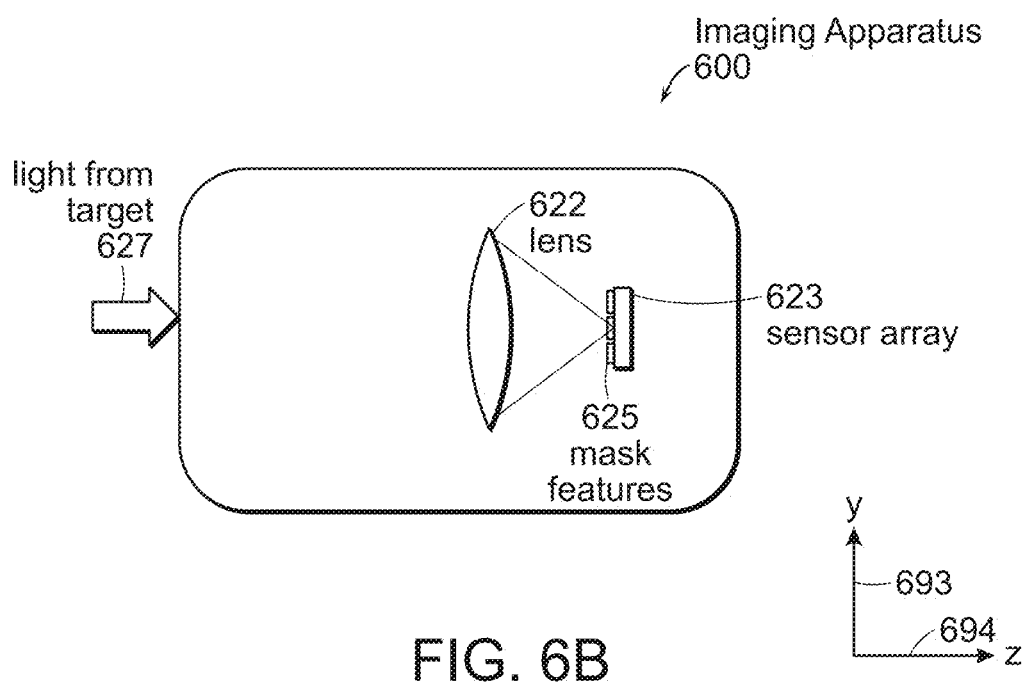
FIG. 6B illustrates an alternative imaging apparatus lacking an intermediate focal plane, according to an embodiment of the present invention.

FIGS. 6A and 6B illustrate an alternative imaging apparatus 600 lacking an intermediate focal plane. A sensor array 623 is oriented in an xy plane with an x axis 692 and a y axis 693. The sensor array 623 includes sensor elements 628, similar to the sensor array 223 in FIG. 2C. However, in contrast to the sensor 223 in FIG. 2C and the separate spatial mask 221 in FIG. 2B, the sensor array 623 has an array of spatial masks such as the spatial masks 625*a-d*, and each of the spatial masks is applied directly to the corresponding sensor element of the sensor array 623. Thus, the adjacent mask features 625*a-b*, for example, implementing different filtering functions are directly applied to adjacent sensor elements of the sensor array 623. In this way, each of the different spatial masks is arranged with respect to a corresponding sensor element of the sensor array 623 such that a filtering function associated with the spatial mask is configured to be applied to light from the target scene to be encoded.

The adjacent mask features are preferably applied to the sensor elements 628 using metallic lithography, but other methods of applying the adjacent mask features can be used as well. One advantage of lithographic application of the mask features is that lithographic application of the mask features can be integrated into the sensor array manufacturing process. Application of the mask features to the sensor array 623 enables motion induced coding without an intermediate focal plane.

FIG. 6B shows the imaging apparatus 600 incorporating the sensor array 623 and oriented in a yz plane with a y axis 693 and a z axis 694. The imaging apparatus 600 includes an optical lens 622 configured to produce an image of the scene at the sensor array 623 without an intermediate focal plane. Configurations lacking an intermediate focal plane, such as the configuration shown in FIG. 6B, are potentially simpler, less expensive, and more compact.

In imaging apparatus 600, there is no motion of optical components of the apparatus with respect to each other. Instead, filtering functions associated with the spatial masks 625 are configured to be applied to the scene to be encoded via motion of the imaging apparatus 600 with respect to the scene.

It should be pointed out that sensor arrays with spatial masks directly applied to the sensor elements can also be used in other embodiments that include an intermediate focal plane. In FIG. 6B, light 627 from the target scene to be encoded (not shown) is incident on the lens 622 and is focused onto the sensor array 623. Light focused onto the sensor array 623 is filtered by the adjacent mask features 625, which are located at the focal plane of the lens 622.

As the imaging apparatus 600 is moved with respect to the scene to be imaged, or as the sensor array 623 is moved with respect to the scene to be imaged, each spatial filtering function shown in FIG. 6A can be applied twice or more to images of the scene to be imaged. It should be noted that the imaging apparatus 600 also has the advantage, like the imaging apparatus 200 in FIG. 2A, of being a single-aperture embodiment. Namely, the lens 622 serves as one single aperture through which the light 627 from the target scene is received and enters the imaging apparatus 600 to be focused toward the sensor array 623.

Other embodiments can include more than one lens or other aperture configured to receive light from the scene to be focused and filtered and detected by the sensor array, particularly with a number the apertures being smaller than a number of the filtering functions applied by the spatial mask. For example, another embodiment includes four lenslets, each lenslet being configured to focus light from the scene onto a set of four sensor elements of a 16-element sensor array. However, the embodiment shown in FIG. 6B, by having a single aperture, avoids the additional complexity of designs involving multiple lenslets.

While this invention has been particularly shown and described with references to example embodiments thereof, it will be understood by those skilled in the art that various changes in form and details may be made therein without departing from the scope of the invention encompassed by the appended claims.

What is claimed is:

1. An imaging apparatus comprising:
   a) one or more apertures configured to receive light from a scene;
   b) a spatial mask comprising a plurality of spatial filters adjacent in a plane of the spatial mask and arranged to apply different, respective, spatial filtering functions, as a function of motion, to the light from the scene to produce an encoded image of the scene, features of the mask defining a pitch, the one or more apertures being fewer in number than the different spatial filtering functions; and
   c) sensor elements defining a pitch and being configured to sense the encoded image of the scene, the pitch of features of the mask being smaller than the pitch of the sensor elements.

2. The imaging apparatus of claim 1, wherein a size of the sensor elements is larger than an optical diffraction limit of the apparatus.

3. The imaging apparatus of claim 1, wherein a smallest pitch of the features implementing the spatial filtering functions is approximately equal to an optical diffraction limit of the apparatus.

4. The imaging apparatus of claim 1, wherein the spatial mask is configured to apply the different spatial filtering functions through motion of the entire imaging apparatus with respect to the scene.

5. The imaging apparatus of claim 1, further comprising a motion actuator configured to apply the different spatial filtering functions to the light from the scene through use of motion of at least one of the spatial mask arranged to produce the encoded image or the sensor elements configured to sense the encoded image.

6. The imaging apparatus of claim 1, wherein the different functions are basis functions representing high-energy coefficients corresponding to information in the scene.

7. The imaging apparatus of claim 1, wherein the different functions are selected to correspond to expected spatial characteristics in the scene.

8. The imaging apparatus of claim 1, wherein the spatial mask is passive and the different functions are fixed functions.

9. The imaging apparatus of claim 1, wherein the different functions correspond to different spatial patterns in the spatial mask, and wherein the spatial patterns are adjustable, the apparatus further comprising a spatial pattern controller in operative communication with the mask to cause the mask to adjust the spatial patterns.

10. The imaging apparatus of claim 1, wherein the plurality of spatial filters are arranged along two non-collinear axes in the plane of the spatial mask.

11. The imaging apparatus of claim 1, further comprising an image processor configured to apply reconstruction as a function of the functions of the mask to data acquired via the sensor elements to reconstruct an image of the scene.

12. The imaging apparatus of claim 11, wherein the image processor is configured to apply a low-fidelity or a high-fidelity reconstruction.

13. The imaging apparatus of claim 11, wherein the image processor is configured to apply reconstruction of nonconsecutive encoded images of the scene.

14. The imaging apparatus of claim 1, wherein the spatial mask is situated at an intermediate focal plane of the imaging apparatus or between lenses of the imaging apparatus.

15. The imaging apparatus of claim 1, further comprising a transmitter configured to transmit data captured via the sensor elements to a reconstruction server and a receiver configured to receive a representation of a reconstructed image from the reconstruction server.

16. The imaging apparatus of claim 15, further comprising:
   a) memory that includes representations corresponding to the functions of the mask; and
   b) an image reconstruction coordinator module configured to read the representations from the memory and forward the representations to the server with the data via the transmitter.

17. The imaging apparatus of claim 1, wherein the sensor elements are configured to acquire encoded measurements of the scene from which a reconstructed image of the scene can be created with higher spatial resolution than the sensor elements with the pitch.

18. The imaging apparatus of claim 1, wherein the number of the apertures is one.

19. The imaging apparatus of claim 1, wherein the spatial mask is further arranged to apply the different spatial filtering functions as part of an analog optical linear transformation to a basis set differing from a pixel basis, and wherein encoded measurements corresponding to the scene to be encoded are basis coefficients for the basis set, the apparatus further comprising a processor configured to nonlinearly compress the basis coefficients.

20. A method of imaging, the method comprising:
   a) receiving light, through one or more apertures, from a scene;
   b) applying different spatial filtering functions, as a function of motion, using a spatial mask comprising a plurality of respective spatial filters adjacent in a plane of the spatial mask, to the light from the scene to produce an encoded image of the scene, the spatial mask having features implementing the different filtering functions, the features defining a pitch, the one or more apertures being fewer in number than the different spatial filtering functions; and
   c) sensing the encoded image of the scene using sensor elements defining a pitch, the pitch of features of the mask being smaller than the pitch of the sensor elements.

21. The method of claim 20, wherein sensing the encoded image includes using one or more optical elements having an optical diffraction limit smaller than a size of the sensor elements.

22. The method of claim 20 wherein sensing the encoded image includes using one or more optical elements having an optical diffraction limit approximately equal to a smallest pitch of the features implementing the spatial filtering functions.

23. The method of claim 20, where the spatial mask and sensor elements form part of an imaging apparatus, and wherein applying the different spatial filtering functions to the light comprises applying motion to the entire imaging apparatus with respect to the scene to be encoded.

24. The method of claim 20, wherein applying different spatial filtering functions to the light from the scene includes applying motion to at least one of the spatial mask used in sensing the encoded image or the sensor elements used in applying the different spatial filtering functions to produce the encoded image.

25. The method of claim 20, wherein applying different spatial filtering functions includes applying different basis functions representing high-energy coefficients corresponding to information in the scene.

26. The method of claim 20, wherein applying different spatial filtering functions to the light from the scene includes applying different spatial filtering functions selected to correspond to expected information in the scene.

27. The method of claim 20, wherein applying different spatial filtering functions by a spatial mask includes applying different fixed spatial filtering functions by a passive spatial mask.

28. The method of claim 20, the method further comprising causing the spatial mask to adjust one or more features of the mask to correspond to a desired spatial filtering function.

29. The method of claim 20, wherein the plurality of spatial filters are arranged along two non-collinear axes in the plane of the spatial mask.

30. The method of claim 20, further comprising applying a reconstruction as a function of the functions of the spatial mask to data acquired via the sensor elements to produce a reconstructed image of the scene.

31. The method of claim 30, wherein applying the reconstruction comprises applying a low-fidelity or a high-fidelity reconstruction.

32. The method of claim 30, wherein applying the reconstruction comprises applying the reconstruction to nonconsecutive encoded measurements of the scene.

33. The method of claim 20, further comprising transmitting data captured via the sensor elements to a reconstruction server or receiving a representation of a reconstructed image from the reconstruction server.

34. The method of claim 33, further comprising:
a) storing representations corresponding to the functions of the spatial mask; and
b) transmitting the representations corresponding to the functions of the spatial mask to the reconstruction server.

35. The method of claim 20, further including making encoded measurements made by the sensor elements available for reconstruction of an image of the scene with higher spatial resolution than the pitch of the sensor elements.

36. The method of claim 20, wherein the receiving the light is through one aperture.

37. The method of claim 20, wherein applying the different spatial filtering functions is performed as part of an analog optical linear transformation to a basis set differing from a pixel basis, and wherein sensing the encoded measurements comprises measuring basis coefficients for the basis set, the method further comprising nonlinearly compressing the basis coefficients.

38. An imaging apparatus, comprising:
a) means for receiving light, through one or more apertures, from a scene;
b) means for applying different spatial filtering functions, as a function of motion, using a spatial mask comprising a plurality of respective spatial filters adjacent in a plane of the spatial mask, to the light from the scene to produce an encoded image of the scene, the spatial mask having features implementing the different filtering functions, the features defining a pitch, the one or more apertures being fewer in number than the different spatial filtering functions; and
c) means for sensing the encoded image using sensor elements defining a pitch, the pitch of features of the mask being smaller than the pitch of the sensor elements.

39. The imaging apparatus of claim 38 further comprising means for applying motion to at least one of the spatial mask or the sensor elements.

* * * * *